UNITED STATES PATENT OFFICE.

HEINRICH PAUL RUDOLF LUDWIG PÖRSCKE AND JULIUS ADOLPH ERWIN ACHENBACH, OF HAMBURG, GERMANY.

NEGATIVE ELECTRODE FOR ALKALINE SECONDARY BATTERIES.

1,096,751.  Specification of Letters Patent. Patented May 12, 1914.

No Drawing.  Application filed January 7, 1913. Serial No. 740,670.

*To all whom it may concern:*

Be it known that we, HEINRICH PAUL RUDOLF LUDWIG PÖRSCKE and JULIUS ADOLPH ERWIN ACHENBACH, subjects of the Emperor of Germany, residing at Hamburg, in Germany, have invented new and useful Improvements in Negative Electrodes for Alkaline Secondary Batteries, of which the following is a specification.

Our invention relates to alkaline secondary batteries, and more particularly to the production of negative electrodes for such batteries.

Heretofore, for the negative electrodes of alkaline secondary batteries, such as nickel-iron batteries, the only practical material has been iron or cadmium, or alloys of iron and cadmium. Difficulties are, however, encountered in the production of negative electrodes, which will show a steady capacity approximating the theoretical, per unit of weight. Good results are obtained when the present process is employed to produce the negative active material.

In the present process, finely powdered iron, cadmium, or cadmium and iron, is treated with concentrated ammonia water and the mixture boiled until a portion of the metal has dissolved. This process can best be carried out on a water bath, with which there is little danger of injurious oxidation. A continuation of the boiling causes the water of the solution to evaporate, leaving a dry powder composed of combined and uncombined metal. The combined metal has largely passed into a compound as:

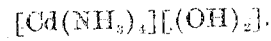

The whole is then pressed into molds and suitably combined with a conductive support.

On electrolysis, the [Cd(NH$_3$)$_4$] ion is plated out, but, immediately decomposing, only a thin film of the metal is formed, ammonia gas escaping. The metal thus formed gives a coherent coating over the particles of uncombined metal. This results in cementing the entire mass mechanically, so that it is no longer subject to the disintegration that is a prominent defect in finely divided electrode material. The ammonia gas is given off from the surface of the electrode and, in escaping to the exterior, causes innumerable minute passages to be formed leaving a spongy, porous mass that is firmly secured together. Thus a strong electrode with a maximum surface is obtained.

In order to insure that the ammonia will more readily act on the metal we may amalgamate the metal with mercury. In order to cause this amalgamation to be formed, it may also be necessary to first copper the metal. These processes are well known.

Having thus described our invention, what we claim is:

1. The process of forming metallic negative electrodes for secondary batteries, which consists in electrolyzing a metal-ammonium compound and depositing the metal liberated on a finely divided mass of metal, the gas liberated passing through the mass in escaping and rendering it porous.

2. The process of forming negative electrode material, which consists in converting a portion of finely divided metal for the electrode into a compound, and then electrolyzing the same, whereby metal and gas are liberated, the metal thus formed combining with the remaining unconverted portion of the finely divided metal and the escaping gas rendering the metal mass porous.

3. The process of forming negative electrodes for alkaline secondary batteries, which consists in partially converting the metal for the electrode into an ammonium compound, and subsequently electrolyzing the latter with finely divided metal as an electrode, whereby the compound, in breaking down, gives a metallic film uniting the particles of metals into a solid mass and ammonia gas which renders the mass porous in escaping.

4. The process of forming negative electrodes for alkaline secondary batteries, which consists in treating finely divided metal with ammonia water, whereby a portion of the metal is converted into an ammonium compound, compressing the remaining metal and the compound, and then electrolyzing the same, whereby the compound is broken up, the freed metal combining with the remaining unconverted metal and the ammonia gas liberated rendering the metal mass porous.

In testimony whereof we have hereunto set our hands in presence of two subscribing witnesses.

HEINRICH PAUL RUDOLF LUDWIG PÖRSCKE.
JULIUS ADOLPH ERWIN ACHENBACH.

Witnesses:
ERNEST H. L. MUMMENHOFF,
IDA CHRIST. HAFERMANN.